United States Patent
D'Angelo et al.

(10) Patent No.: US 12,219,925 B2
(45) Date of Patent: Feb. 11, 2025

(54) BOOT AND COAT FOR DOMESTIC ANIMALS

(71) Applicant: LES INNOVATIONS DOG E KATZ INC., Montreal (CA)

(72) Inventors: Antonio D'Angelo, Montreal (CA); Terry D'Amore, Montreal (CA)

( * ) Notice: Subject to any disclaimer, the term of this patent is extended or adjusted under 35 U.S.C. 154(b) by 0 days.

(21) Appl. No.: 16/963,951

(22) PCT Filed: Feb. 28, 2020

(86) PCT No.: PCT/CA2020/050274
§ 371 (c)(1),
(2) Date: Jul. 22, 2020

(87) PCT Pub. No.: WO2020/176980
PCT Pub. Date: Sep. 10, 2020

(65) Prior Publication Data
US 2021/0378213 A1 Dec. 9, 2021

Related U.S. Application Data

(60) Provisional application No. 62/812,480, filed on Mar. 1, 2019.

(51) Int. Cl.
*A01K 13/00* (2006.01)
*B32B 1/00* (2024.01)
(Continued)

(52) U.S. Cl.
CPC .......... *A01K 13/007* (2013.01); *A01K 13/006* (2013.01); *B32B 1/00* (2013.01);
(Continued)

(58) Field of Classification Search
CPC ....... A01K 13/007; A01K 13/006; A01L 9/00; A61D 9/00; B68C 5/00; A43B 23/0285;
(Continued)

(56) References Cited

U.S. PATENT DOCUMENTS 2,424,172 A * 7/1947 Huddleston .......... A01K 13/007
54/82
2,446,371 A * 8/1948 McNeill ............... A01K 13/007
36/111
(Continued)

FOREIGN PATENT DOCUMENTS

AT 405782 B 4/1999
CA 2486628 A1 5/2005
(Continued)

OTHER PUBLICATIONS

European Patent Office, Extended European Search Report, Sep. 20, 2022, 11 pages, Application No. EP20766612, Munich, Germany.
(Continued)

*Primary Examiner* — Jeffrey R Larsen
(74) *Attorney, Agent, or Firm* — Wolter Van Dyke Davis, PLLC; Michael W. Taylor

(57) ABSTRACT

The known dog boots and coats lack in the area of "easy to put on" and "stays on". The present invention relates to a boot, including: a fabric material; a silicone gel material for covering the inner surface of the fabric material, the silicone gel material being connected to the fabric material; wherein the boot is configured to be reversible so as to cover and conform to a paw and lower leg of the domestic animal that comes in contact with the silicone gel material while the boot is put on; and wherein the silicone material and fabric material are configured to flexibly and removably secure, through the flexibility of the fabric and silicone materials, the boot to the paw and lower leg of the domestic animal; and wherein the silicone gel material provides shock-absorbing protection to the paw. The coat includes a portion with three layer fabric/silicone/fabric.

13 Claims, 4 Drawing Sheets

(51) Int. Cl.
  *B32B 3/30* (2006.01)
  *B32B 5/02* (2006.01)
  *B32B 25/10* (2006.01)
  *B32B 25/20* (2006.01)
(52) U.S. Cl.
  CPC .......... *B32B 3/30* (2013.01); *B32B 5/02* (2013.01); *B32B 25/10* (2013.01); *B32B 25/20* (2013.01); *B32B 2250/02* (2013.01); *B32B 2250/03* (2013.01); *B32B 2250/40* (2013.01); *B32B 2262/0261* (2013.01); *B32B 2262/0276* (2013.01); *B32B 2262/0292* (2013.01); *B32B 2262/062* (2013.01); *B32B 2262/065* (2013.01); *B32B 2262/14* (2013.01); *B32B 2307/304* (2013.01); *B32B 2307/7265* (2013.01); *B32B 2437/00* (2013.01); *B32B 2437/02* (2013.01)
(58) Field of Classification Search
  CPC ....... A43B 13/189; A43B 23/07; B32B 25/20; B32B 2437/02
  See application file for complete search history.

(56) References Cited

U.S. PATENT DOCUMENTS

| | | | | | |
|---|---|---|---|---|---|
| 2,651,853 | A | * | 9/1953 | Lewis | A01K 13/007 54/82 |
| 4,458,431 | A | * | 7/1984 | Sinclair | A01K 13/007 36/111 |
| 4,543,911 | A | * | 10/1985 | Marshall | A61D 9/00 54/82 |
| 5,148,657 | A | * | 9/1992 | Stafford | A01K 13/007 54/82 |
| 5,495,828 | A | * | 3/1996 | Solomon | A01K 13/007 36/111 |
| 6,186,097 | B1 | * | 2/2001 | Brockmann | A61D 9/00 36/111 |
| 6,470,832 | B1 | * | 10/2002 | Peacock | A01K 13/007 54/82 |
| 6,526,920 | B1 | * | 3/2003 | Griffin | A01K 13/007 54/82 |
| 6,546,704 | B1 | * | 4/2003 | Fisher | A01K 13/007 54/82 |
| 6,851,394 | B1 | * | 2/2005 | Young | A01K 13/007 54/82 |
| 7,677,206 | B1 | * | 3/2010 | Southworth | A01K 13/007 36/111 |
| 8,161,668 | B2 | | 4/2012 | Ketzenberg et al. | |
| 8,176,880 | B2 | | 5/2012 | Hurwitz | |
| 8,567,350 | B2 | | 10/2013 | Wrenwood Maloney et al. | |
| 9,629,336 | B1 | * | 4/2017 | Paxton | A01K 13/007 |
| 9,943,065 | B1 | * | 4/2018 | Paxton | A01K 13/007 |
| 10,028,486 | B1 | * | 7/2018 | Kath | A01K 13/001 |
| 10,238,089 | B1 | * | 3/2019 | Paxton | A01K 13/007 |
| 11,369,083 | B1 | * | 6/2022 | Paxton | A43B 13/223 |
| 2003/0070403 | A1 | * | 4/2003 | Osha | A01L 15/00 54/82 |
| 2003/0154625 | A1 | * | 8/2003 | Royle | A01K 13/007 36/7.3 |
| 2003/0164145 | A1 | * | 9/2003 | St. John | A01K 13/007 119/850 |
| 2005/0092260 | A1 | * | 5/2005 | Paxton | A01K 13/007 119/850 |
| 2005/0188925 | A1 | * | 9/2005 | Yun | A43C 11/00 54/82 |
| 2005/0241188 | A1 | * | 11/2005 | Yun | A01K 13/007 36/111 |
| 2006/0037561 | A1 | * | 2/2006 | Fine | A01K 13/007 119/850 |
| 2006/0042563 | A1 | * | 3/2006 | Galloway | A01K 13/007 119/850 |
| 2007/0039565 | A1 | * | 2/2007 | Krottinger | A01K 13/007 119/850 |
| 2007/0039566 | A1 | * | 2/2007 | Krottinger | A01K 13/007 119/850 |
| 2007/0044734 | A1 | * | 3/2007 | Maloney | A01K 13/007 119/850 |
| 2007/0074677 | A1 | * | 4/2007 | Behme | A01K 13/007 119/850 |
| 2007/0089691 | A1 | * | 4/2007 | Hendy | A01K 13/007 119/850 |
| 2007/0175409 | A1 | * | 8/2007 | Vogelman | A61D 9/00 36/111 |
| 2007/0175410 | A1 | * | 8/2007 | Vogelman | A61D 9/00 36/111 |
| 2008/0067163 | A1 | | 3/2008 | Axinte et al. | |
| 2008/0149046 | A1 | * | 6/2008 | Tsai | A01K 13/007 119/850 |
| 2008/0229618 | A1 | * | 9/2008 | McKay-Leffler | A01K 13/007 36/111 |
| 2009/0182257 | A1 | | 7/2009 | Benetti | |
| 2009/0229538 | A1 | * | 9/2009 | Friedland | A01K 13/007 119/850 |
| 2011/0036307 | A1 | * | 2/2011 | Walker | A01K 13/007 119/851 |
| 2011/0041779 | A1 | * | 2/2011 | Hurwitz | A01K 13/007 119/850 |
| 2011/0041780 | A1 | * | 2/2011 | Hurwitz | A01K 13/007 119/850 |
| 2011/0048339 | A1 | * | 3/2011 | Quinn | A01K 13/007 119/850 |
| 2011/0265733 | A1 | * | 11/2011 | Paxton | A01K 13/007 119/850 |
| 2012/0066932 | A1 | | 3/2012 | Friedland | |
| 2012/0132153 | A1 | * | 5/2012 | Maloney | A01K 13/007 119/850 |
| 2013/0219838 | A1 | * | 8/2013 | Swearingen | A01K 13/007 427/398.1 |
| 2013/0319346 | A1 | * | 12/2013 | Kerler | A01K 29/00 119/850 |
| 2014/0150299 | A1 | * | 6/2014 | Entler | A01K 13/007 36/111 |
| 2014/0318478 | A1 | | 10/2014 | Cruz | |
| 2014/0360053 | A1 | * | 12/2014 | Morris | A01K 13/006 36/111 |
| 2015/0053148 | A1 | * | 2/2015 | Huang | D03D 1/00 28/169 |
| 2016/0227739 | A1 | * | 8/2016 | Yang | A01K 13/007 |
| 2016/0262349 | A1 | * | 9/2016 | Swearingen | A01L 15/00 |

FOREIGN PATENT DOCUMENTS

| | | |
|---|---|---|
| CN | 201718313 U | 1/2011 |
| CN | 103190357 A | 7/2013 |
| CN | 204811454 U | 12/2015 |
| CN | 106418741 | 2/2017 |
| CN | 206371582 U | 8/2017 |
| CN | 209105923 U | 7/2019 |
| DE | 10213615 A1 | 10/2003 |
| EP | 2789226 A2 | 10/2014 |
| GB | 2406492 A | 10/2003 |
| GB | 2508504 A | 6/2014 |
| JP | H1132615 A | 2/1999 |
| WO | 2013005116 A1 | 1/2013 |

OTHER PUBLICATIONS

Sandra Janezic et al., Dissemination of Clostridium difficile spores between environment and households: Dog paws and shoes, Zoonoses and Public Health, Apr. 23, 2018, pp. 669-674, vol. 65—Issue 6, Wiley Online Library.
ISR—PCT/CA2020/050274—Date: May 20, 2020.

* cited by examiner

BOOT AND COAT FOR DOMESTIC ANIMALS

CROSS-REFERENCE TO RELATED APPLICATIONS

This application is a National Entry Application of PCT application No. PCT/CA2020/050274 filed on Feb. 28, 2020 and published in English under PCT Article 21(2), which itself claims benefit of U.S. patent application Ser. No. 62/812,480, filed on Mar. 1, 2019. All documents above are incorporated herein in their entirety by reference

FIELD OF THE INVENTION

The present invention pertains to a sleeve-like covering for the paw of a household domestic animal, such as a dog. The present invention also pertains to a coat for covering the body of a household domestic animal, such as a dog.

BACKGROUND OF THE INVENTION

Currently, the dog boot market is comprised of dog boots that offer low consumer appreciation.

For example, U.S. Pat. Nos. 8,360,012 and 8,794,191 by Friedland disclose a disposable dog boot that is essentially a typical party balloon made of latex or polymer material. In use, the narrower top end thereof is widened, and the dog's paw is inserted into the narrow opening toward the wider bulbous area. The bottom end conforms to the shape of the paw, while remaining loose. However, this dog boot, which is commercialized under the name Pawz™, is difficult to put on, so much so that the inventor had to launch another product that looks like prongs to open the tip in order to allow the consumer an easier time to put on the balloon-like boot. Also, this boot is not eco-friendly and not rigid due to the extremely thin layer of rubber. This causes frustration with consumers as they constantly need to change the balloon-like boots as they easily rip and tear. As well, these boots don't keep paws all that warm and protected. Such boot also has a short length and therefore it doesn't cover an extensive part of the lower-leg of the dog allowing for limited protection against cold and wetness. Finally, such boot allows for much space floating around the dog's paw so that the dog can try to chew and play with the balloon-like boot.

Also known are dog boots commercialize under the name Pawks™, which are polyester blend socks dipped in a rubber coating. Different variations of this boot are made, some with a Velcro™ closing. However, these boots are difficult to put on as the rubber is not stretchy. The biggest complaint with this boot is that they don't stay on properly and that is why other companies upgraded the Pawks™ to add hook and loop fasteners, such as Velcro™ which helped resolve this problem but created another problem as it makes it harder to put on. This boot does not hug paws properly as the rubber is not elastic enough to do that. The rubber can to freeze up and stiffen and thereby causes potential cracking of the boot and uneasiness when dog is walking or running. Also, aside from the rubber portion which only covers the paws, water goes through the polyester blend fabric and then wets the lower leg and drips down to the paw.

There is therefore a consumer demand to have dog boots that can easily be put on, stay on, are comfortable for the dog to walk or run and are easy to remove. All with keeping the dog's paws and partial lower leg warm and more importantly, dry.

The current offerings in dog boots lack in the area of "easy to put on" and "stays on". It is common knowledge in the pet industry that there is a missing gap in the dog boot market for a product that responds to these aforementioned problems.

In addition, currently, the dog coat market is comprised of dog coats that offer average consumer appreciation and there is a consumer demand to have dog coats that can easily be put on, provide warmth and waterproof protection and are comfortable for the dog to walk and/or run.

The current offerings in dog coats lack in the area of "easy to put on" and full waterproof and warmth coverage. It is common knowledge in the pet industry that there is a missing gap in the dog coat market for a product that responds to these aforementioned problems.

Known existing products are commercialized under the name Wrap Jackets & Elastofit™, which are essentially jackets that use simple Velcro™ to attach the coat underneath the belly and may stretch underneath using elastics, however they use a hook and loop fastener, such as Velcro™ underneath the belly which has some disadvantages as it becomes less secure with time as dust and hair clutters it. Also, Velcro™ is not very comfortable for dogs. Furthermore, the known Velcro™ systems or the Elastofit™ design have a major flaw which is coverage as these do not cover the underneath portion of the dog's body where wind, rain, snow, slush and cold exist most as it is the closest to the ground. This leaves the dog's underbelly and chest exposed to being cold and wet.

Also know existing coat products are commercialized under the Canada Pooch Stretch Coat™, which uses a fabric underneath. However, it is not waterproof and does not provide any isolation or warmth defensive vs wind, wet and cold weather.

SUMMARY OF THE INVENTION

In order to address the above and other drawbacks, there is provided a boot for a domestic animal, comprising: a fabric material having a tubular shaped body, a bottom closed end and a top open end, the fabric material defining an outer surface and an inner surface; a silicone gel material for covering the inner surface of the fabric material, the silicone gel material being connected to the fabric material; wherein the boot is configured to cover and conform to a paw and lower leg of the domestic animal that comes in contact with the silicone gel material while the boot is put on; and wherein the silicone material and fabric material are configured to flexibly and removably secure, through the flexibility of the fabric and silicone materials, the boot to the paw and lower leg of the domestic animal; and wherein the silicone gel material provides shock-absorbing protection to the paw.

There is also provided a method of protecting the paw of a domestic animal, comprising: producing or obtaining a boot comprising: a fabric material having a tubular shaped body, a bottom closed end and a top open end, the fabric material defining an outer surface and an inner surface; a silicone gel material for covering the inner surface of the fabric material, the silicone gel material being connected to the fabric material; reversing or folding the boot so as to expose the silicone gel material outwardly; slipping the paw into the reversed or folded boot so as to cover and conform to the paw and lower leg of the domestic animal that comes in contact with the silicone gel material while the boot is put on, whereby the silicone material and fabric material flexibly and removably secure, through the flexibility of the fabric and silicone materials, the boot to the paw and lower leg of the domestic animal and the silicone gel material provides shock-absorbing protection to the paw.

There is also provided a coat for a domestic animal, comprising an outer layer comprising: at least on a portion of the coat: a first fabric material; a middle layer comprising a silicone gel material; and an inner layer comprising a second fabric material; wherein the middle layer is sandwiched between the outer and inner layers.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

Figure 4:
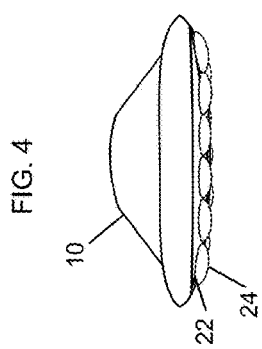
FIG. 4 is a front view of the dog boot in a folded position, in accordance with an illustrative embodiment of the present invention.
Figure 5:
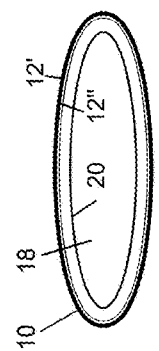
FIG. 5 is a top view of the dog boot shown in FIG. 1.
Figure 3:
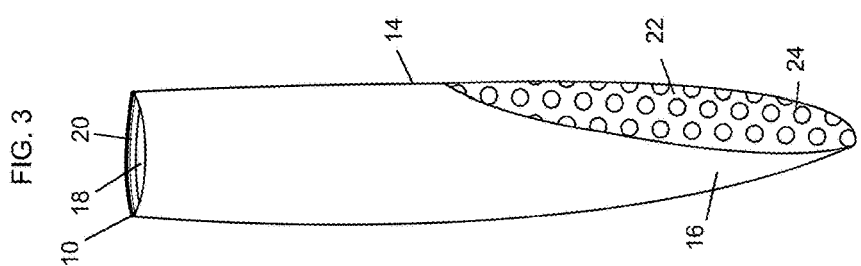
FIG. 3 is a side view of the dog boot shown in FIG. 1.
Figure 2:
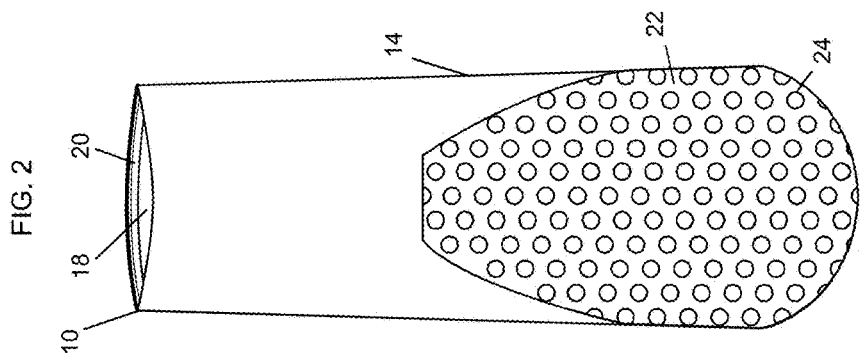
FIG. 2 is a back view of the dog boot shown in FIG. 1.
Figure 1:
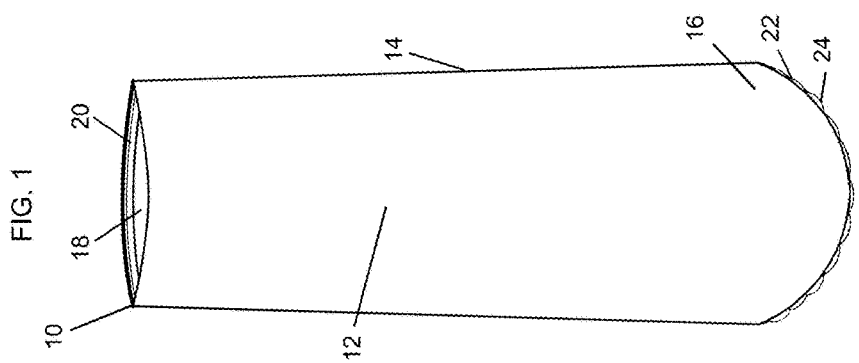
FIG. 1 is a front view of a dog boot, in accordance with an illustrative embodiment of the present invention.
Figure 6:
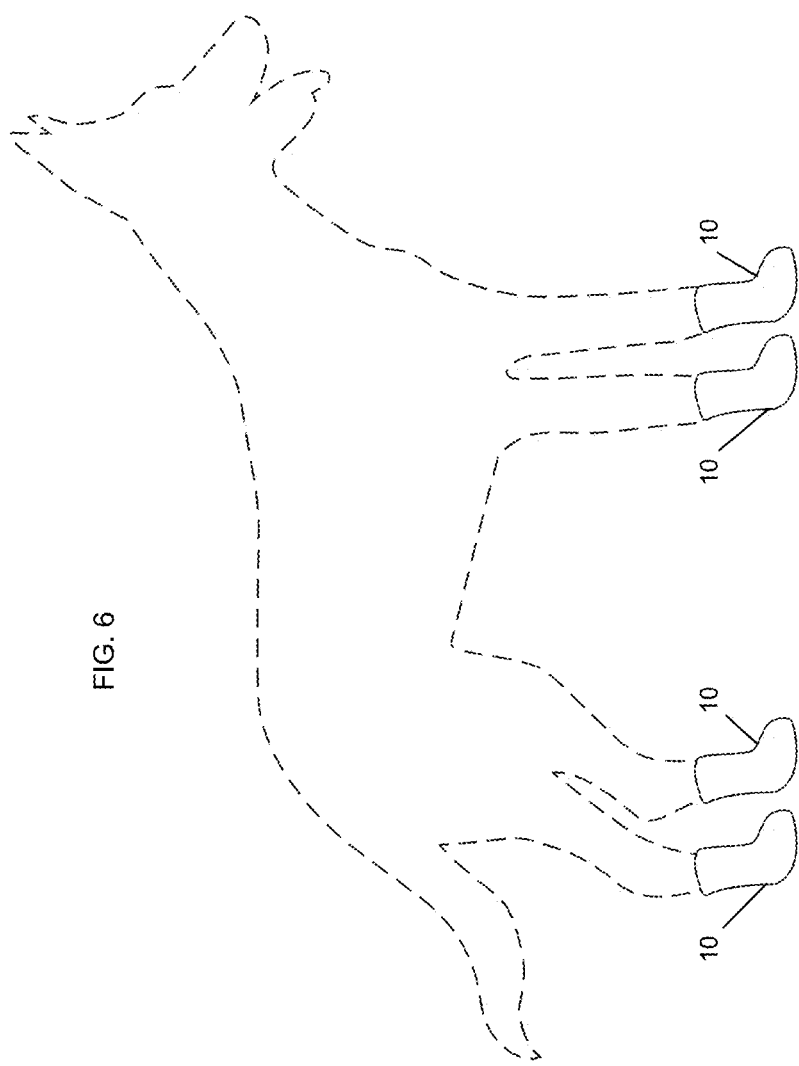
FIG. 6 is a side view of four dog boots placed on the paws and lower legs of a dog, in accordance with an illustrative embodiment of the present invention.
Figure 7:
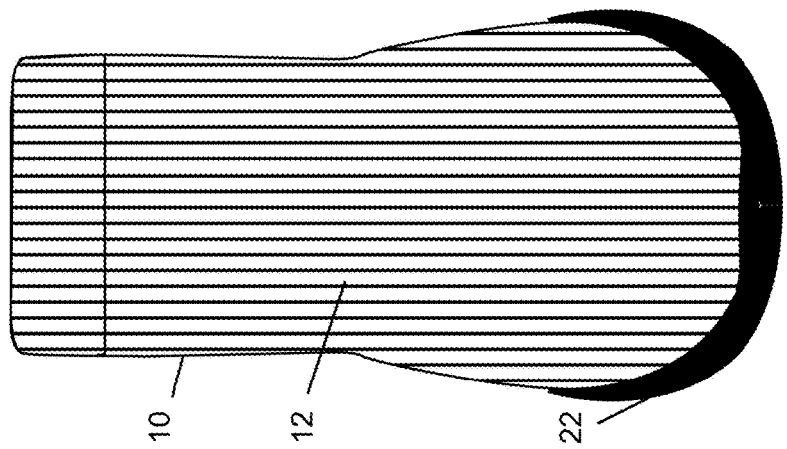
FIG. 7 is a front view of a dog boot, in accordance with another illustrative embodiment of the present invention.
Figure 8:
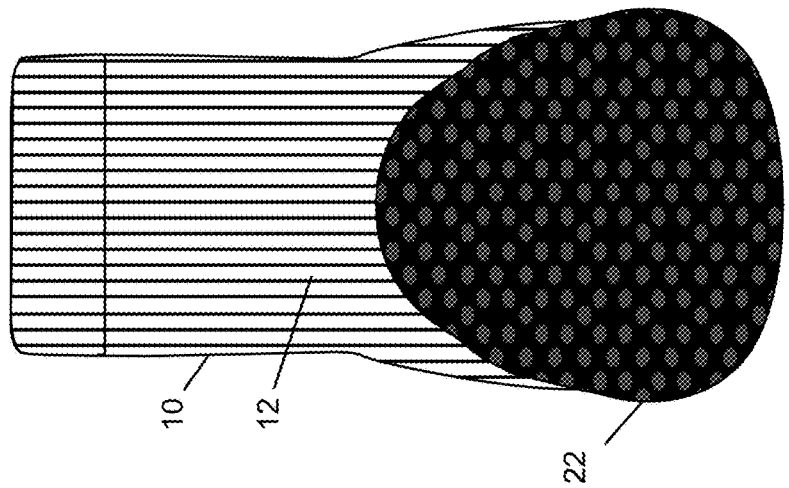
FIG. 8 is a back view of the dog boot shown in FIG. 7.
Figure 9:
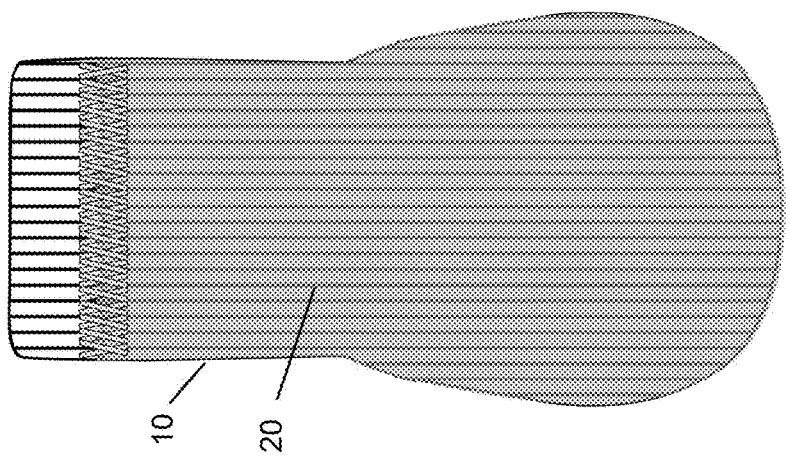
FIG. 9 is a front view of a reversed boot showing an inside silicone lining.
Figure 10:
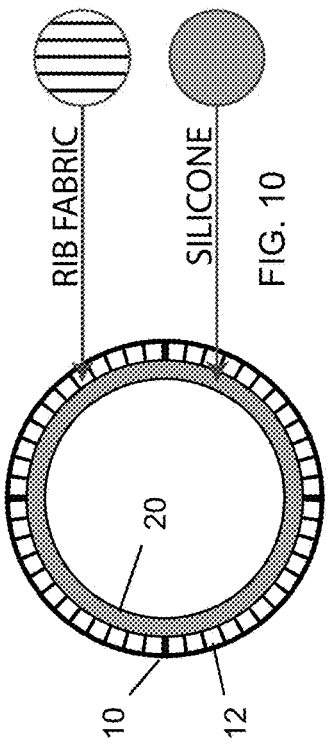
FIG. 10 is a cross section top view of the boot shown in FIG. 7.

The present invention is illustrated in further details by the following non-limiting examples.

Referring now to FIGS. 1 to 10, there is shown a dog boot 10, according to a preferred embodiments of the present invention. The boot 10 may also be configured to be used with different types of household domestic animals, and is preferably non-disposable as it may be reused multiple times.

The boot 10 is made of a fabric material 12 having a tubular shaped body 14, a bottom closed end 16 and a top open end 18. The fabric material 12 defines an outer surface 12' and an inner surface 12". The boot includes a silicone gel material 20 that covers the inner surface 12" of the fabric material 12. The silicone gel material 20 is connected to the inner surface 12" of the fabric material 12 such as by fusing or bonding.

The fabric material 12 may be made of polyester with a mixture or blend of another flexible material such as spandex, nylon cotton, bamboo, hemp or any combination thereof. The fabric material is sufficiently stretchable so as to conform to the paw and lower leg of a domestic animal. Preferably, the fabric material 12 is a ribbed fabric material. The ribs in the fabric material help in increasing the fabric stretchability. Persons skilled in the art will understand that other fabric materials may be used to achieve the same results.

Advantageously, one may configure the thickness of the fabric material 12 and/or silicone gel material 20 to provide better warmth to the paw and lower leg of the domestic animal. The thickness of the fabric material 12 may of about 0.5 mm to 1.5 mm, or preferably about 1 mm. The fabric material 12 may weigh between 100 to 300 grams/m², preferably between 120 to 140 grams/m². The thickness of the silicone gel material 20 may be of about 1 mm to 6 mm, preferably about 2 mm to 3 mm.

The silicone gel material 20 may be made thick enough to be waterproof and tear resistant. Because the silicone gel is covered by the fabric material 12, it is less likely that a dog would chew on the boot 10. The silicone gel material 20 is preferably soft enough and has enough tackiness or stickiness so as to properly adhere and cover the paw and lower leg of the domestic animal.

In embodiments, the silicone gel material 20 has a hardness of about 60 Shore A or less. The silicone gel material 20 may have a hardness of about 55, 50, 45, 40, 35, 30, 25, 20, 15, 10, 5 Shore A or less.

In embodiments, the silicone gel material 20 has a hardness of about 90 Shore OO or less. The material may have a hardness of about 85, 80, 75, 70, 65, 60, 55, 50, 45, 40, 35, 30, 25, 20, 15, 10, 5 Shore OO or less.

Preferably, at least a portion of the bottom closed end 16 includes a grip layer 22 to provide improved grip to the boot 10 where the paw is inserted. A plurality of protuberances 24 may be provided for improving grip of the boot 10. The grip layer 22 and protuberances 24 may be made of a harder silicone material than the silicone gel material 20 used for the inside of the boot 10. The boot 10 may have a thinner layer of the silicone gel material 20 if the grip layer 22 is provided thereon. If no grip layer 22 is provided, it is preferable to have a thicker layer of silicone gel material 20 on the inside of the boot 10 to improve shock-absorption when the animal is standing, walking, or running. Instead of the grip layer 22 with protuberances 24, the boot 10 may be provided with rubber puffed prints (not shown) onto the same portion of the closed bottom end 16. These rubber puffed prints are directly printed on the outer surface 12' of the fabric material 12.

In use, the boot 10 is configured to be reversible so as to cover and conform to a paw and lower leg of the domestic animal that comes in contact with the silicone gel material 20 while the boot 10 is put on. As such, the silicone material 20 and fabric material 12 are configured to flexibly and removably secure, through the flexibility of the fabric and silicone materials, the boot 10 to the paw and lower leg of the domestic animal.

To the knowledge of the inventors, the present dog boot is the first dog boot to fuse a polyester blend fabric with silicone gel. It is easy to put on, as it goes on reversed so the silicone gel is on the outside when putting on the boot, gliding it up the paw and lower leg so the polyester blend is facing outward when the boot is on the dog.

The boot 10 may have different length sizes to provide more coverage for the dog's lower leg by varying the length of the tubular shaped body 14.

The boot 10 offers one of the most accessible and stretchable opening of any dog boot which is a big part of why it allows it to be the easiest boot to put onto a dog's paw. So much so it may be put on with one hand only, a major advantage versus other dog boots that need to be installed with two hands. The boot 10 may be put with one hand only as follows. Insert human thumb and index or middle finger into base of boot 10 with the silicone gel material 20 facing outward, expand fingers, insert paw and roll or glide upward to complete insertion of boot 10 onto dog's paw and lower leg. To remove the boot 10, simply roll down and remove with one hand as well so that the boot 10 is then removed with the silicone gel material 20 exposed, ready to be inserted again with silicone gel material 20 on the outside facing.

Advantageously, the boot does not allow any space between the dog's paw (or lower leg) and the boot. This provides four (4) main advantages: 1) helps keep the boot on firmly so it does not come off. No hook and loop fasteners, such as Velcro™ or snaps are needed to keep the boot on securely; 2) it does not allow the dog to try to chew or gnaw at the boot; 3) it keeps cold and wetness out; 4) it allows dog to walk with ease and comfort as the boot takes the exact shape of every movement from dog's lower leg and paw, as well the silicone gel material 20 provides shock-absorbing protection for a more comfortable feel for dog or animal.

Advantageously, the boot allows easy removal as the boot easily glides/rolls off the lower leg and paw.

Advantageously, due to silicone gel's excellent thermal properties, extreme cold or hot temperatures (−60 to +200 degrees Celcius or −76 to 392 Fahrenheit) do not change the performance of the product.

Advantageously, the polyester blend of the fabric material 12 allows for a design aspect so different patterns and colours can be offered to consumers.

Advantageously, the added grip provided by the grip layer 22 with protuberances 24 (the grip layer 22 is studded or made with small "teeth") underneath the boot is an option to allow for better grip on multiple surfaces and added protection, basically a third layer of protection between underneath paw and floor surfaces.

In embodiments, the silicone gel may be infused with Aloe vera or similar product or moisturizer or combinations thereof to help prevent the cracking of the dogs paws. Indeed, although a dog's paw pads are hardy, they may crack or even bleed. This will mostly happen when you take your dog hiking through an unusual area, especially if the ground is rocky and abrasive, but it may also happen due to hard weather conditions such as snow, heat, cold or ice. Aloe vera is one of the best natural remedies for burns and skin conditions, but it may also be used to treat dermatitis in dogs and it is also very useful to treat disorders affecting dog's foot pads.

Advantageously, a dog boot with a silicone gel infused with Aloe vera may provide the following health benefits: it regenerates skin cells and promotes restoration of the affected foot pad area; it has an analgesic effect and anti-inflammatory action, therefore relieving the discomfort that the dog may feel when walking; its provides antiseptic action, as it may prevent wounds on the dog's foot pads from becoming infected.

Figure 12:
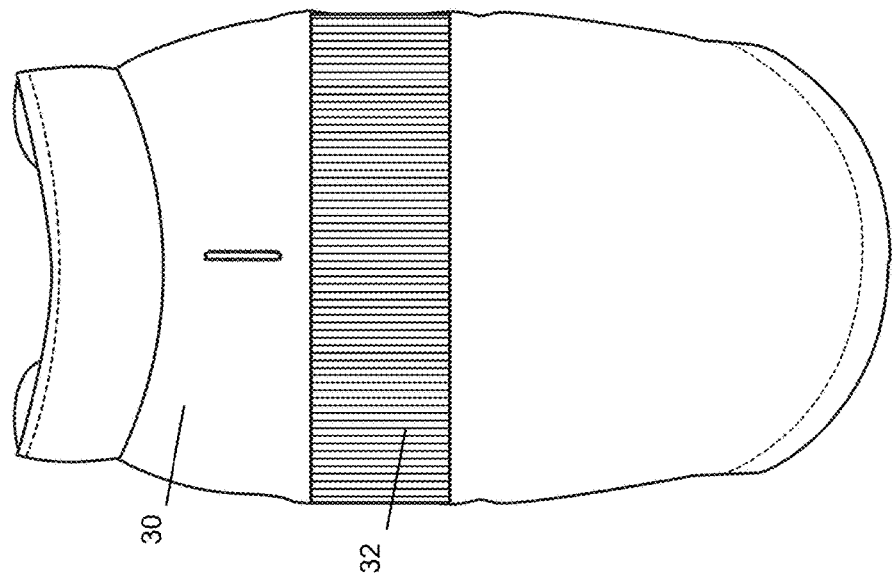
FIG. 12 is a top view of the dog coat shown in FIG. 11.
Figure 11:
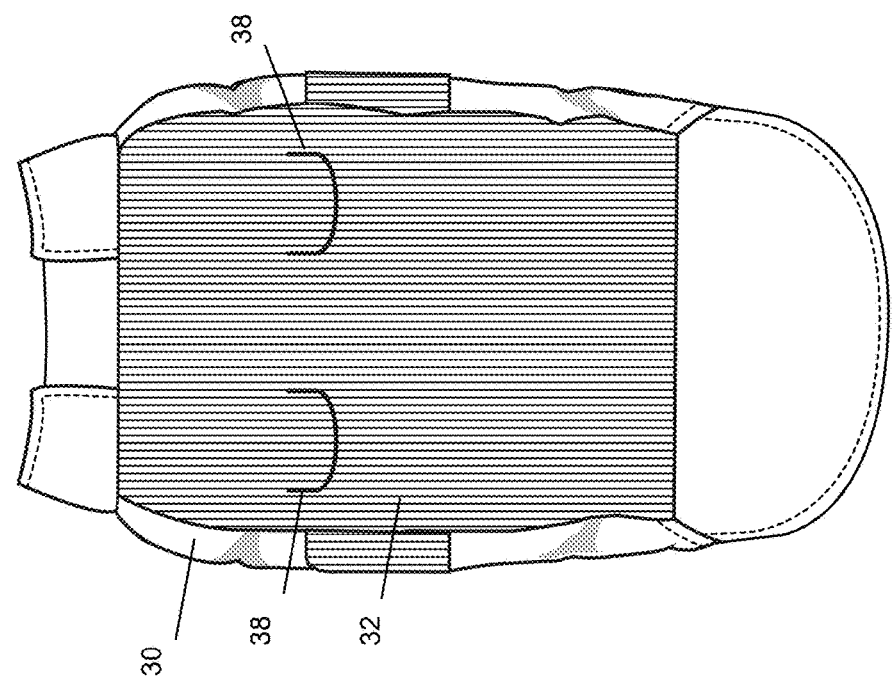
FIG. 11 is a bottom view of a dog coat, in accordance with an illustrative embodiment of the present invention.
Figure 13:
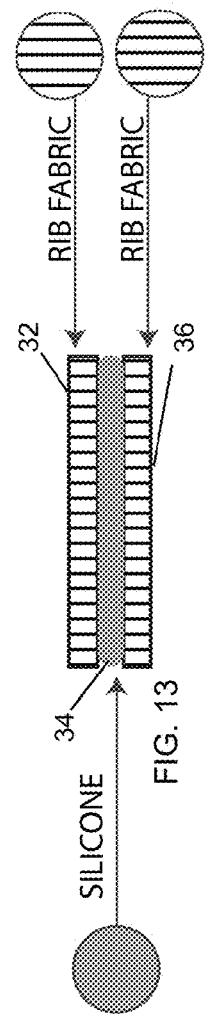
FIG. 13 is a cross section of a portion of the dog coat.

Referring now to FIGS. 11 to 13, there is shown a coat 30 according to a preferred embodiment of the present invention. A portion of a cross-section of the coat is made of an outer layer 32 made of a first fabric material, a middle layer 34 made of a silicone gel material and an inner layer 36 made of a second fabric material, which may be the same as the first fabric material. The middle layer 34 is sandwiched between the outer and inner layers 32, 36.

Preferably, the underneath of the dog coat is provided with a pair of slits to allow the passage of the dog's legs. The slits 38 are preferably U-shaped, but could take different shapes to achieve the same function.

Preferably, the coat 30 uses a fusion of a polyester blend fabric with silicone gel. The silicone gel is sandwiched between two layers of polyester/spandex fabric. The silicone/poly fabric panel is positioned underneath the dog's belly and chest and as well a horizontal panel on the top.

Advantageously, the coat 30 can be put on like a sweater as it can stretch about three times its size. No other known dog coat offers this type of stretching and comfort for the dog.

Advantageously, the coat 30 provides 4-way stretch: due to its stretchability, from both panels (top and bottom). The coat 30 allows the dog to walk or run with ultimate ease as there is no hook and loop fastener, such as Velcro™ underneath the belly and chest allowing for free-motion comfort with a silicone gel ultra-comfort feel. In particular, underneath the dog's armpit (using our "U" shaped design which provides a slash guard for front legs), they will experience a very soft feel/sensation due to silicone gel. As well, on the top part of the coat, a horizontal panel allows the coat 30 to extend up and down providing further mobility and coverage for longer length dogs in particular. No dog coat in the world to the inventors' knowledge provides this stretchability on both top and bottom sides.

Advantageously, due to silicone gel's excellent thermal properties, extreme cold or hot temperatures (−60 to +200 degrees or −76 to 392 Fahrenheit) the dog will have maximum protection for their chest and underbelly which is the most exposed and vulnerable part of their body. Therefore, waterproof, windproof and maximum heat retention.

Advantageously, the polyester blend allows for a design aspect so different patterns and colours can be offered to consumers.

The scope of the claims should not be limited by the preferred embodiments set forth in the examples, but should be given the broadest interpretation consistent with the description as a whole.

The invention claimed is:

1. A boot (10) for a domestic animal, comprising:
a fabric material (12) having a tubular shaped body (14) with a bottom closed end (16) and a top open end (18), with a front and back of the tubular shaped body having a width that is substantially the same between the bottom closed end and the top open end, and with sides of the tubular shaped body being tapered at the bottom closed end, the fabric material (12) defining an outer surface (12') and an inner surface (12") of the tubular shaped body; and
a silicone gel material (20) covering the entire inner surface (12") of the tubular shaped body (14) defined by the fabric material (12), the silicone gel material (20) being fused to the entire inner surface (12") of the fabric material (12) and extending from the closed bottom end to the top open end;
wherein the boot is configured to cover and conform to a paw and lower leg of the domestic animal that comes in contact with the silicone gel material (20) while the boot is put on;
wherein the silicone gel material (20) and fabric material (12) are configured to flexibly and removably secure, through the flexibility of the fabric and silicone materials, the boot (10) to the paw and lower leg of the domestic animal without the use of straps; and
wherein the silicone gel material (20) provides shock-absorbing protection to the paw.

2. The boot of claim 1, wherein the fabric material (12) comprises polyester mixed with a flexible material including spandex, nylon cotton, bamboo, hemp or any combination thereof.

3. The boot of claim 1, wherein the fabric material (12) comprises a blend of polyester and spandex.

4. The boot of claim 1, wherein a thickness of the fabric material (12) and/or silicone gel material (20) is configured to improve warmth to the paw and lower leg of the domestic animal.

5. The boot of claim 1, wherein the silicone gel material (20) is waterproof and/or is infused with Aloe vera or a moisturizing product or any combination thereof.

6. The boot of claim 1, wherein at least a portion of the bottom closed end (16) comprises a grip layer (22) to provide grip to the paw of the domestic animal as well as added shock-absorbing protection.

7. The boot of claim 6, wherein the grip layer (22) is made of silicone material that is harder than the silicone gel material (20).

8. The boot of claim 6, wherein the grip layer (22) comprises a plurality of protuberances (24) for improving grip of the boot (10).

9. A method of protecting the paw of a domestic animal, comprising:
  producing or obtaining a boot (10) comprising:
    a fabric material (12) having a tubular shaped body (14) with a bottom closed end (16) and a top open end (18), with a front and back of the tubular shaped body having a width that is substantially the same between the bottom closed end and the top open end, and with sides of the tubular shaped body being tapered at the bottom closed end, the fabric material (12) defining an outer surface (12') and an inner surface (12") of the tubular shaped body; and
    a silicone gel material (20) covering the entire inner surface (12") of the tubular shaped body (14) defined by the fabric material (12), the silicone gel material (20) being fused to the entire inner surface (12") of the fabric material (12) and extending from the closed bottom end to the top open end;
  reversing or folding the boot so as to expose the silicone gel material (20) outwardly; and
  slipping the paw into the reversed or folded boot so as to cover and conform to the paw and lower leg of the domestic animal that comes in contact with the silicone gel material (20) while the boot is put on, whereby the silicone material (20) and fabric material (12) flexibly and removably secure, through the flexibility of the fabric and silicone materials, the boot (10) to the paw and lower leg of the domestic animal without the use of straps, and the silicone gel material (20) provides shock-absorbing protection to the paw.

10. The method of claim 9, wherein the fabric material (12) comprises polyester mixed with a flexible material including spandex, nylon cotton, bamboo, hemp or any combination thereof.

11. The method of claim 9, wherein said step of producing the boot (10) comprises a step of connecting a grip layer (22) on at least a portion of the bottom closed end (16) or printing rubber puffed prints on at least a portion of the bottom closed end (16).

12. The method of claim 11, wherein the grip layer (22) is made of silicone material that is harder than the silicone gel material (20).

13. The method of claim 11, wherein the grip layer (22) comprises a plurality of protuberances (24) for improving grip of the boot (10).

* * * * *